(12) United States Patent
Yang et al.

(10) Patent No.: US 8,903,166 B2
(45) Date of Patent: Dec. 2, 2014

(54) CONTENT-AWARE RANKING FOR VISUAL SEARCH

(75) Inventors: Linjun Yang, Beijing (CN); Bo Geng, Beijing (CN); Xian-Sheng Hua, Beijing (CN)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 12/690,817

(22) Filed: Jan. 20, 2010

(65) Prior Publication Data
US 2011/0176724 A1 Jul. 21, 2011

(51) Int. Cl.
*G06K 9/62* (2006.01)
(52) U.S. Cl.
CPC .................. *G06K 9/6252* (2013.01)
USPC ............. 382/155; 382/157; 382/159
(58) Field of Classification Search
CPC ..... G06K 9/6201; G06K 9/4652; G06K 9/78; G06K 9/0063; G06K 9/6267; G06K 9/00771; G06K 9/46; G06K 9/62; G06T 11/60
USPC ......... 382/155, 156, 157, 158, 159, 160, 161, 382/224, 225, 226, 227, 228; 706/15, 16, 706/20, 22, 23, 24, 41, 43; 128/924, 925
See application file for complete search history.

(56) References Cited

U.S. PATENT DOCUMENTS

| | | | |
|---|---|---|---|
| 5,915,250 A * | 6/1999 | Jain et al. | 1/1 |
| 7,499,916 B2 | 3/2009 | Liu et al. | |
| 2007/0288453 A1 | 12/2007 | Podilchuk | |
| 2008/0118151 A1 | 5/2008 | Bouguet et al. | |
| 2009/0271433 A1* | 10/2009 | Perronnin et al. | 707/103 R |
| 2009/0300055 A1 | 12/2009 | Mestha et al. | |
| 2009/0313239 A1 | 12/2009 | Wen et al. | |
| 2009/0313294 A1* | 12/2009 | Mei et al. | 707/103 R |

OTHER PUBLICATIONS

Cui, et al., "Real Time Google and Live Image Search Re-ranking", retrieved on May 26, 2010 at <<http://www.stanford.edu/~jycui/data/Jingyu_Cui_MM08.pdf>>, ACM, Proceeding of International Conference on Multimedia (MM), Vancouver, CA, Oct. 2008, pp. 729-732.
Jing, et al., "PageRank for Product Image Search", retrieved on May 26, 2010 at <<http://www2008.org/papers/pdf/p307-jingA.pdf>>, ACM, Proceeding of International Conference on World Wide Web (WWW), Beijing, CN, Apr. 2008, pp. 307-316.
Jing, et al., "VisualRank: Applying PageRank to Large-Scale Image Search", retrieved on May 26, 2010 at <<http://www.cc.gatech.edu/home/yjing/pami_camera_ready.pdf>>, IEEE Computer Society, Transactions on Pattern Analysis and Machine Intelligence, vol. 30, No. 11, Nov. 2008, pp. 1-14.
O'Hare, et al., "Combination of Content Analysis and Context Features for Digital Photograph Retrieval", retrieved on May 26, 2010 at <<http://citeseerx.ist.psu.edu/viewdoc/download?doi=10.1.1.64.9086&rep=rep1&type=pdf>>, Institution of Engineering and Technology, European Workshop on the Integration of Knowledge, Semantic and Digital Media Technologies (EWIMT), London, UK, 2005, pp. 1-6.

* cited by examiner

*Primary Examiner* — Brian Le
(74) *Attorney, Agent, or Firm* — Carole Boelitz; Micky Minhas; Lee & Hayes PLLC

(57) ABSTRACT

This document describes techniques that utilize a learning method to generate a ranking model for use in image search systems. The techniques leverage textual information and visual information simultaneously when generating the ranking model. The tools are further configured to apply the ranking model responsive to receiving an image search query.

15 Claims, 5 Drawing Sheets

CONTENT-AWARE RANKING FOR VISUAL SEARCH

BACKGROUND

Currently, a large number of images are available via various databases located at distributed network locations. With the availability of such a large number of images, techniques for efficiently and accurately retrieving and ranking relevant images in response to a submitted query have gained importance.

Conventionally, image retrieval and ranking models are based solely on textual information associated with images. To this end, the visual content of the image is neglected when identifying and ranking images. Consequently, imperfect search results frequently appear due to mistaken associations between the textual information of an image and the actual image content.

SUMMARY

This document describes techniques for generating a ranking model that utilizes both the text associated with an image and the image's visual content in determining a ranking for that image. These techniques optimize the ranking model based on a set of training data which includes a set of queries, images returned for those queries, and rankings that have previously been determined for the images. The ground-truth relevance of images for the set of queries is also provided based on human annotation. The optimized ranking model is then implemented on one or more devices and utilized by the devices in association with image search and retrieval. In response to a query submitted for a particular image search, the techniques determine images that are relevant to the query, rank the images based on the optimized ranking model, and provide the ranked results.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, algorithms, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

Figure 3:
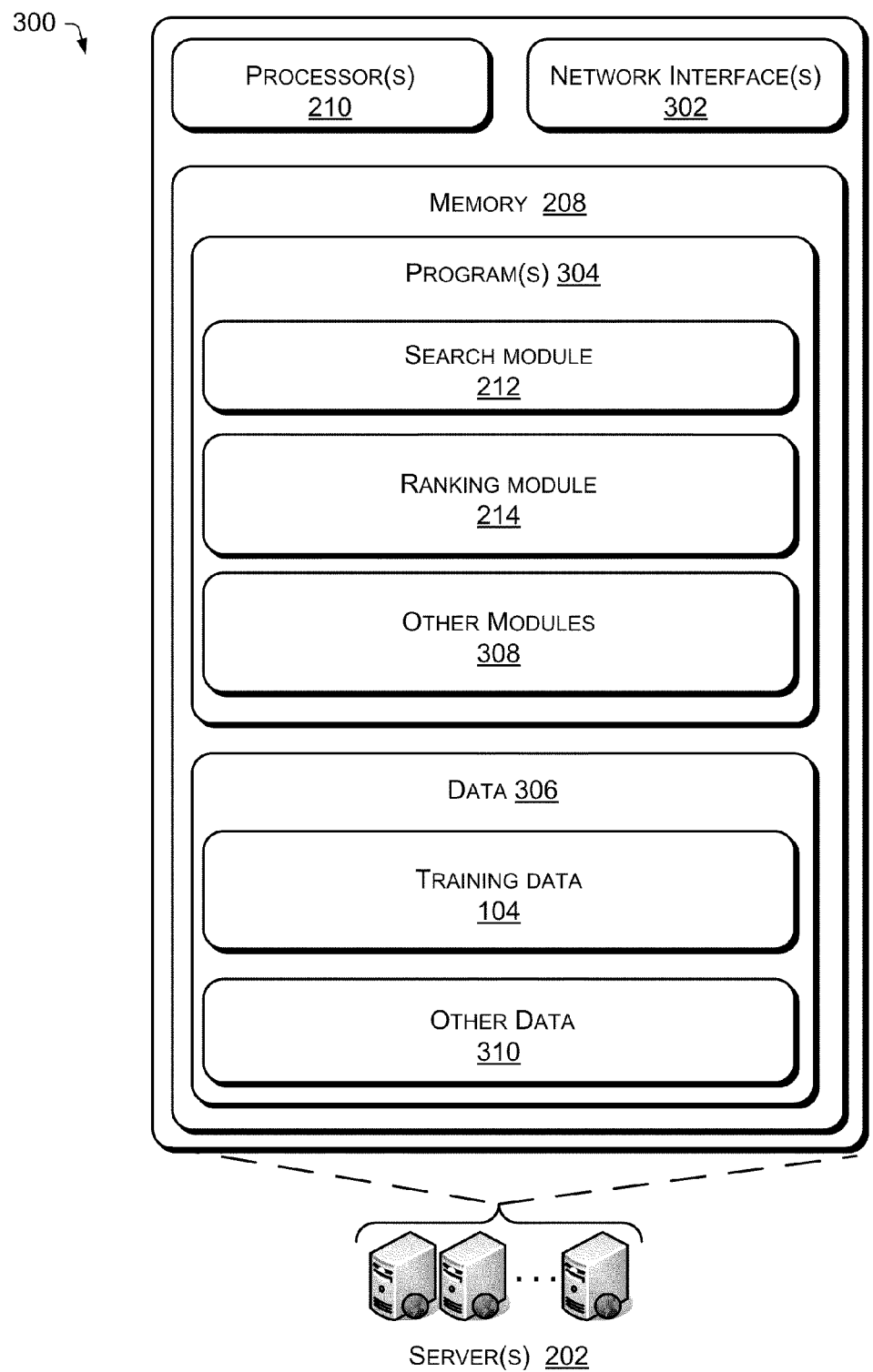

FIG. 3 further illustrates an example computing system implementing the generation and application of the image content ranking model, in accordance with various embodiments.

Figure 4:
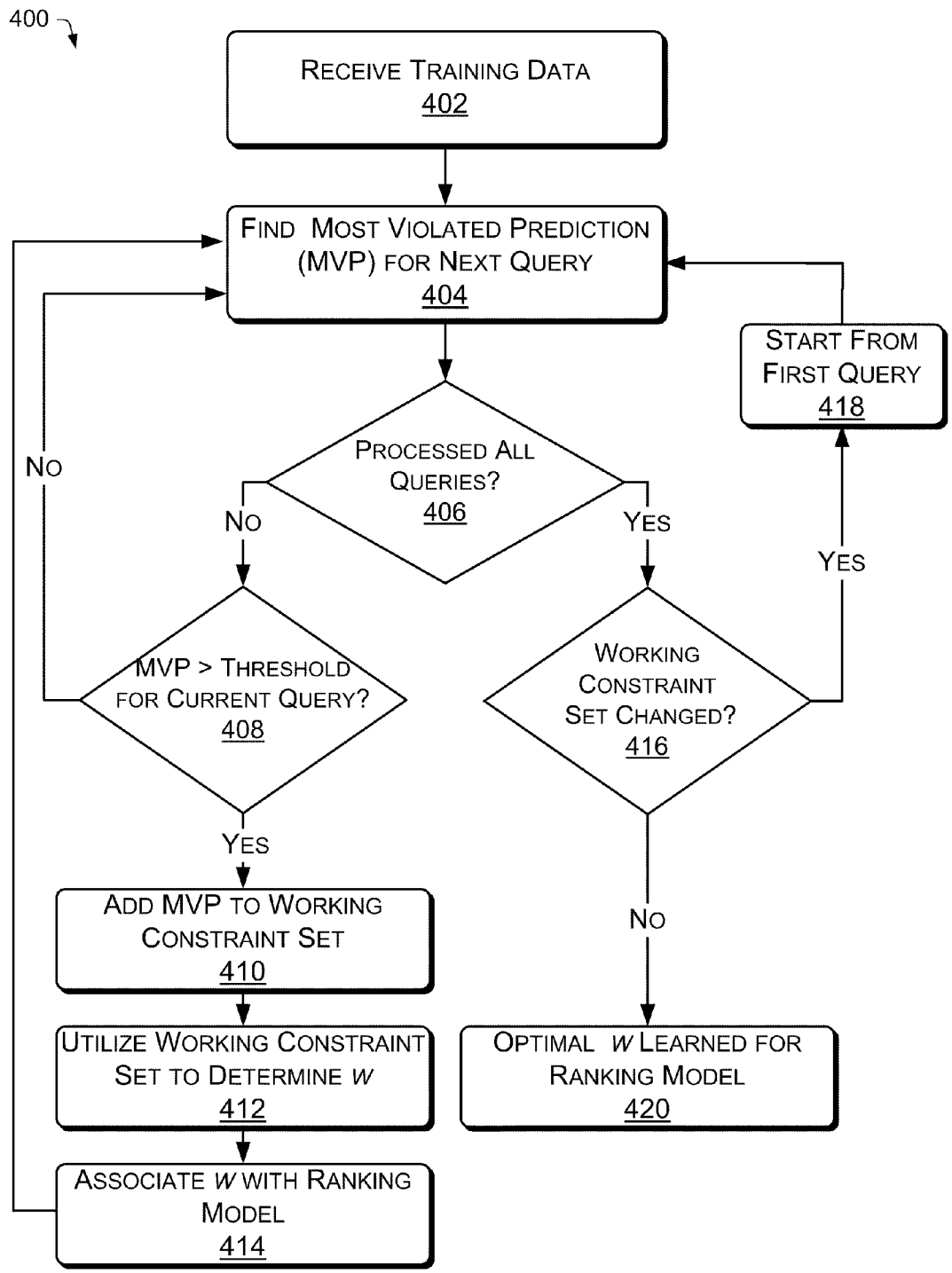

FIG. 4 illustrates an example process that optimizes the image content ranking model, in accordance with various embodiments.

Figure 5:
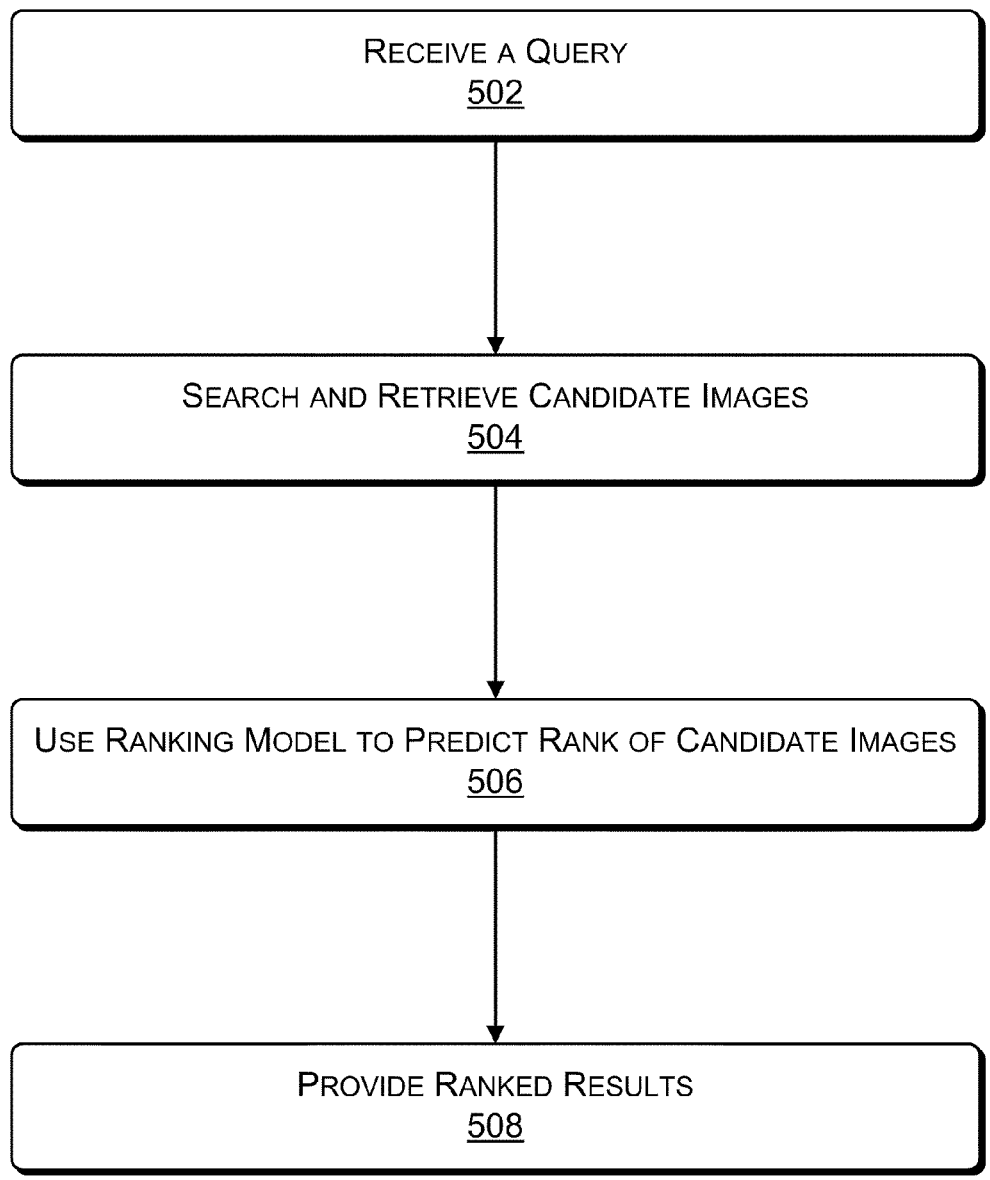

FIG. 5 illustrates an example process that applies the image content ranking model in association with image search and retrieval systems, in accordance with various embodiments.

DETAILED DESCRIPTION

Overview

The following description sets forth tools for generating an image content ranking model based jointly on textual information and visual information associated with a set of images. Once the ranking model is generated, the tools are configured to apply the ranking model in image search and retrieval systems. Image search and retrieval systems and image search engines are configured to perform at least two tasks, one task to identify (e.g. find) candidate images related to a submitted query, and a second task that utilizes a ranking model to rank the candidate images according to their relevance to the query.

Incorporating visual information when learning a ranking model provides a robust and accurate ranking model by suppressing noises and errors associated with textual features. The textual features are based on textual metadata used to identify and describe an image, the textual metadata including for example a title of an image, anchor text, surrounding text, term frequency, etc.

The ranking model may be employed as part of, or in conjunction with image search and retrieval systems and commercial image search engines. Image search and retrieval systems generally include one or more databases of images distributed over numerous network locations. For the purpose of this document, image search and retrieval is discussed using the term "images." However, it is understood in the context of this document that image search and retrieval can correspond to static images, videos, photos, documents, or any type of information in which visual content features can be extracted. Thus, the term "images," as used in this document, encompasses multiple types of electronically available information.

For purposes of this document, visual information associated with an image includes visual image content extracted or derived from the image. The visual image content may include, but is not limited to features associated with color, texture, shape and spatial distribution of the image. Several visual tools widely used in computer vision that help aid in extracting, deriving and comparing visual features may include, for example: attention guided color signature, color spatialet, wavelet, scale-invariant feature transform (SIFT), multi-layer rotation invariant EOH, histogram of gradient (HoG), facial feature, etc.

In one embodiment, a ranking model is learned utilizing training data during a training stage. The training data may include data such as, a set of text queries (e.g. training queries), a set of images corresponding to the training queries that include textual and visual features (e.g. training images), and relevance labels provided by human oracles.

Figure 1:
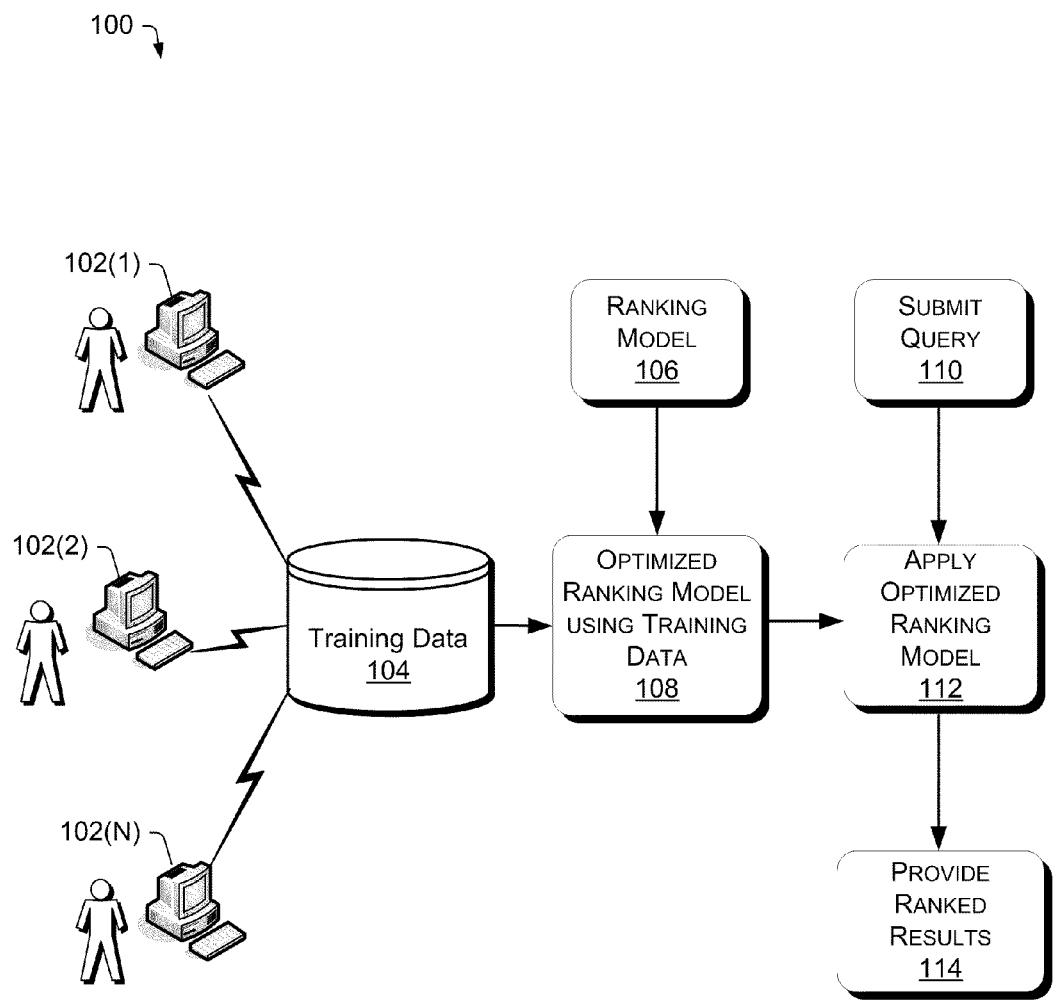
FIG. 1 illustrates an overview of the optimization and use of an image ranking model, in accordance with various embodiments.

FIG. 1 illustrates an example overview of the learning and the prediction of a ranking model. As shown in overview 100, one or more human oracles 102(1) ... (N) label the training data 104 and that training data 104 is utilized to learn and optimize the ranking model in the training stage. The human oracles 102(1) ... (N) are one or more persons assigned the task of viewing (e.g. eyeballing) a set of training images, and labeling the set of training images according to their relevance to a particular training query.

In one embodiment, the training data 104 includes a set of training queries. For example, the number of training queries may be 50, 100, 200, 1000, etc. The indicated number of training queries utilized in the training data 104 is not limiting and may depend on costs, time and/or processing resources associated with the human oracles, computing systems, etc.

After determining a set of training queries, a set of sampled training images are associated with each training query. The set of sample images may come from a commercial Web search engine, for example. Again the set of sample training images is not limited by a particular number. For example, there may be 50, 100, 200, 500 sampled training images associated with each training query.

Once the training queries and their associated sample training images are determined, the human oracles 102(1) . . . (N) label each sampled training image according to its relevance to the training query. In one embodiment, three relevance degrees are utilized: not relevant, relevant, and highly relevant. Coefficient scores assigned to the different relevance degrees may be determined and assigned based on preference. Of course, it is understood in the context of this document that relevance degrees may be more granular (e.g. having more than three relevance degrees). For example, the human oracles may provide a specific rank 1 through 100 to a set of 100 sampled training images, thereby providing one hundred relevance degrees.

After the human oracles 102(1) . . . (N) label the training data 104, the labeled training data 104 can be used to iteratively update one or more parameters in an initial ranking model 106 in order to learn an optimized ranking model 108. To this end, the training stage is able to compare the output of the ranking model with the actual ground-truth ranking provided by the human oracles 102(1) . . . (N), and thereby iteratively update one or more parameters in the ranking model in order to learn an optimized ranking model 108. Once the ranking model is optimized and a submitted query is received 110 via an online submission (opposed to a training query in the training stage), the optimized ranking model can be applied 112, and accurate ranked results can be provided 114. Optimizing the ranking model 108 and applying the optimized ranking model 112 are described in further detail herein.

Illustrative Architecture

Figure 2:
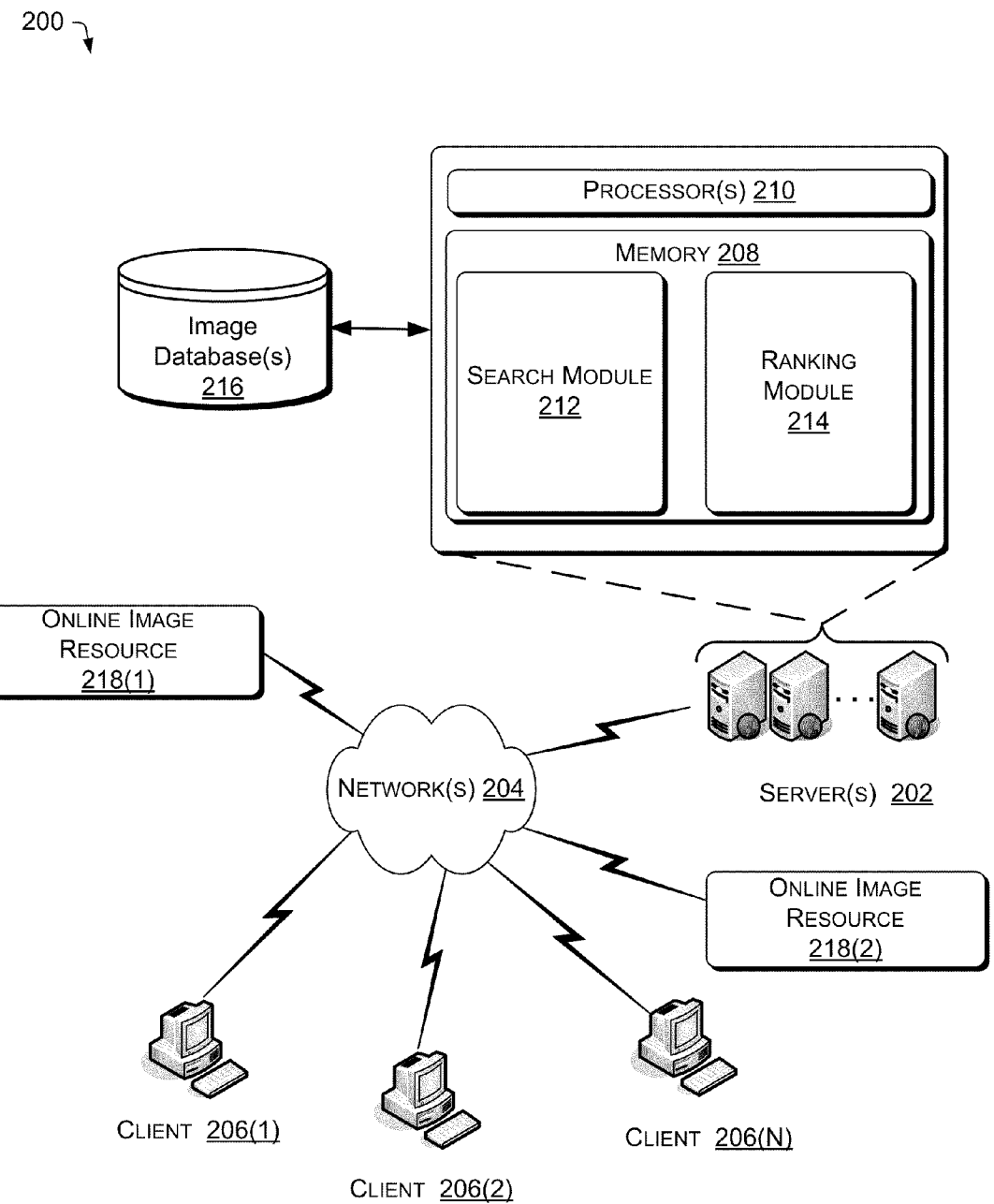
FIG. 2 illustrates an example operating environment for implementing the generation and application of the image content ranking model, in accordance with various embodiments.

FIG. 2 shows an illustrative architecture 200 that may employ the described techniques. To this end, architecture 200 includes one or more server computing devices 202 communicating through one or more network(s) 204 with one or more client computing devices 206(1) . . . 206(N). In one embodiment, the server computing devices 202 may be one or more web search engines such as Microsoft® live search engine, Google® search engine, and Yahoo® search engine, etc. The server computing devices 202 each comprise a memory 208 and one or more processors 210. Furthermore, the server computing devices may include a search module 212, a ranking module 214, and one or more local image databases 216.

Architecture 200 can include any number of client computing devices 206(1) . . . (N). Client computing devices 206(1) . . . (N) may comprise one of an array of computing devices capable of connecting to one or more network(s) 204, such as a server computer, a client computer, a personal computer, a laptop computer, a mobile phone, a personal digital assistant (PDA), and the like. In at least one embodiment, architecture 200 can be the World Wide Web, including numerous PCs, servers, and other computing devices spread throughout the world. Alternatively, in another possible embodiment, architecture 200 can include a LAN/WAN with a limited number of PCs.

The server computing devices 202 utilize the search module 212 and the ranking module 214 to search, access and rank images located via one or more local image databases 216. In addition to searching and accessing images locally, the search module 212 and the ranking module 214 may search, access and rank images located across a plurality of remote resources 218(1) and 218(2) distributed across networks 204. It is understood in the context of this document, that image resources 218(1) and 218(2) may be any online entity configured to store and maintain image content that a search engine may search in response to receiving a query. For example, image resources 218(1) and 218(2) may be web servers, file transfer servers, image databases, social information servers, photo repositories, etc.

It is further understood in the context of this document that the functionality of the search module 212 and the ranking module 214 may spread across a plurality of servers. For example, a first server computing device may comprise the ranking module 214 implemented to learn and optimize the ranking model, and a second server may comprise the search module 212 configured to utilize the learned ranking model to provide ranked search results. In another embodiment, the separate functionality of both the search module 212 and the ranking module 214 may be spread across a plurality of servers. For example, two servers may implement the functionality associated with the ranking module 214 to learn and generate the ranking model.

The client computing devices 206(1) . . . (N) may be coupled to each other or to the server computing devices 202 in various combinations through a wired and/or wireless network, including a LAN, WAN, or any other networking technology known in the art.

The server computing devices 202 include the ranking module 214 that implements the learning method optimizing a ranking model. In various embodiments, the search module 212 utilizes the ranking model to retrieve and rank a set of candidate images and provide results based on their relevance to a submitted query. In at least one embodiment, the query is a user-submitted query entered via a client device. In another embodiment, the query may be an automated query submitted by a client device at a configurable time and/or in response to a scheduled event. In at least one embodiment, a user may enter a query directly at the location of the server computing devices 202.

As is well known in the art, a submitted query includes one or more words or symbols (i.e. query terms) entered, for example, via a graphical user interface (GUI), with the intent of finding and receiving a desired image or a set of desired images. For example, if a user wanted to search for images depicting a "white Arabian horse," he or she may enter a query reciting a "white Arabian horse." Of course, a user may vary his or her query terms based on what he or she thinks may provide acceptable results.

The illustrative architecture 300 in FIG. 3 further illustrates an example server computing device 202 on which, the ranking module 214 implements the learning method that optimizes the ranking model. It is to be appreciated, that optimizing the ranking model may also be performed on standalone client computing devices, such as clients 206(1) . . . (N). In this example, the server computing device 202 may include one or more processor(s) 210, a memory 208, and one or more network interfaces 302. The processor(s) 210 may be a single processing unit or a number of units, all of which could include multiple computing units. The processor(s) 210 may be implemented as one or more microprocessors, microcomputers, microcontrollers, digital signal processors, central processing units, state machines, logic circuitries, and/or any devices that manipulate signals based on operational instructions. Among other capabilities, the processor(s) 210 may be configured to fetch and execute computer-readable instructions stored in the memory 208.

The memory 208 may include any computer-readable storage medium known in the art including, for example, volatile memory (e.g. RAM) and/or non-volatile memory (e.g., flash, etc.). The memory 208 stores program instructions that can be executed by the processor(s) 210.

The network interface(s) 302 facilitates communication between the server computing device 202 and the client computing devices 206(1) . . . (N). Furthermore, the network interface(s) 302 may include one or more ports for connecting a number of client computing devices 206(1) . . . (N) to the server computing devices 202. The network interface(s) 302 can facilitate communications within a wide variety of networks and protocol types, including wired networks (e.g. LAN, cable, etc.) and wireless networks (e.g. WLAN, cellular, satellite, etc.). In one embodiment, the server computing device 202 can receive an input query from a user or client via the ports connected through the network interface(s) 302 and the server computing device 202 may return the retrieved relevant images to the client computing device via the network interface(s) 302.

Memory 208 includes program(s) 304 and program data (data) 306. Program(s) 304 include for example, the search module 212, the ranking module 214, and other software module(s) 308. The data 306 includes training data 104 and other data 310. The other data 310 stores various data that may be generated and/or utilized during the functioning of the server computing device 202.

The ranking module 214 is configured to learn and generate an optimized ranking model. Learning an optimized ranking model and applying the optimized ranking model are also described below with reference to FIGS. 4 and 5.

Learning the Ranking Model in a Training Stage

As previously mentioned, the ranking module 214 implements a learning method in a training stage in order to optimize the ranking model. The learning method utilizes the labeled training data 104 discussed in FIG. 1 to learn and optimize the ranking model.

For the purpose of this document, the training queries in the labeled training data 104 are denoted as training query set $Q=\{q_2, q_3, \ldots, q_m\}$ where $q_m$ is the total number of training queries utilized. Each query $q^i$ in Q comprises $\{x^i, v^i, y^i\} \in Q$, where $x^i=[x_1^i, \ldots, x_{N^i}^i] \in \mathcal{X}$ denotes the query dependent textual features for query image pairs, $v^i=[v_1^i, \ldots, v_{N^i}^i] \in \mathcal{V}$ denotes the image visual features extracted from the training images, $y^i=[y_1^i, \ldots, y_{N^i}^i] \in \mathcal{Y}$ represents the ranking (e.g. labeling) of the training images as provided by the human oracles 102(1) . . . (N), and $N^i$ stands for the number of sampled training images for each query $q^i$.

The target ranking function, jointly incorporating the textual features and the visual features, can be denoted as:

$$f: \mathcal{X} \times \mathcal{V} \to \mathcal{Y}, \quad (1)$$

which maps the joint textual and visual features spaces $\mathcal{X} \times \mathcal{V}$ to the ranking space $\mathcal{Y}$. Thus, the goal of learning a unified ranking model is to find an optimal ranking function $f$ so that the expected ranking loss in the training query set Q:

$$\mathcal{R}_Q^\Delta(f) = \frac{1}{|Q|} \sum_{i=1}^{|Q|} \Delta(y^i, f(x^i, v^i)) \quad (2)$$

is minimized, where $\hat{y}=f(x^i,v^i)$ is the ranking output of the ranking model (e.g. the ranking of the relevant images), and $\Delta(y^i,\hat{y})$ measures the loss of the ranking output $\hat{y}$ with the ground truth label ranking $y^i$ provided by the human oracle.

As described herein, the goal of learning the ranking model is to optimize the ranking model so that the loss between the output of the ranking model $\hat{y}$ for a particular query and the actual ground truth label ranking $y^i$ provided by the human oracle for that particular query is minimized. To this end, if the error is completely minimized, an ideal ranking model would rank a set of images the exact same as the human oracles 102(1) . . . (N) would rank (e.g. label) the same set of images.

A ranking list output by a ranking function is structured because the ranks of the images depend on the set of images being ranked, thus they are interdependent. Solely addressing the textual features, given a query $q^i$ with textual feature(s) $x^i$, the ranking function may be defined as:

$$\hat{y}=f(x^i)=\text{argmax}_{y \in \mathcal{Y}} F(x^i,y;w) \quad (3)$$

where w represents model parameters, and $F(x^i,y;w)$ may be defined as a linear function of w in the following manner:

$$F(x^i,y;w)=w^T\Psi(x^i,y), \quad (4)$$

where $\Psi(x^i,y)$ jointly maps the textual feature $x^i$ and the ranking prediction output y by the ranking model into real values. Using a feature mapping function:

$$\Psi(x^i,y)=\Sigma_{j=1}^{N^i}x_j^iy_j, \quad (5)$$

equation (4) can be transformed into:

$$\hat{y}=\text{argmax}_{y \in \mathcal{Y}}(z^i)^T y, \quad (6)$$

where $z^i=[w^Tx_1^i, \ldots, w^Tx_{N^i}^i]$ may be regarded as a score list of the sampled training images corresponding to query $q^i$. Interpreting equation (6) from a geometrical view, one can discern that equation (6) maximizes the cosine of the angle between the score list $z^i$ and y, which tends to make the direction of y comply with that of $$\frac{z^i}{\|z^i\|}.$$

Thus, for a fixed w, the solution to equation (6) provides that $\hat{y}$ is a ranked list sorted according to the derived relevance scores $z^i=w^Tx^i$.

However, ranking models based solely on textual information (e.g. $x^i$) produce noise and errors that contribute to mistaken and mismatched results. Consequently, a ranking model that jointly utilizes textual information and visual information may aid in improving the performance of ranking models based solely on textual information. Assuming that relevant images for a submitted query have some degree of visual consistency, introducing and incorporating a visual consistency element into a ranking model may improve the accuracy of ranking a set of images. The visual consistency element is based on extracting visual features from the images as previously discussed.

Based on Laplacian Eigenmaps, the following ranking model is derived:

$$\hat{y}=\text{argmax}_{y \in \mathcal{Y}} F(w,x^i,v^i,y)$$

$$\hat{y}=\text{argmax}_{y \in \mathcal{Y}} w^T\Psi(x^i,y)-\gamma\Sigma_{m,n=1}^{N^i}G_{mn}^i(y_m-y_n)^2 \quad (7)$$

where $\gamma>0$ is a trade-off parameter that balances the textual relevance term $w^T\Psi(x^i,y)$ and the visual consistency term $\Sigma_{m,n=1}^{N^i}G_{mn}^i(y_m-y_n)^2$. $G^i$ denotes an adjacency graph that models the local geometric information of the distribution of images in their visual feature space, where each element of $G^i$ measures the similarities between a pair of images. The elements of $G^i$ are defined as follows:

$$G_{mn}^i = \begin{cases} Sim(V_m^i, V_n^i), & \text{if } V_n^i \text{ is in the } KNN \text{ of } V_m^i \\ 0, & \text{otherwise} \end{cases} \quad (8)$$

Here, $Sim(V_m^i, V_n^i)$ is a similarity estimation between $V_m^i$ and $V_n^i$, and $G_{mn}^i$ is a sparse graph employing a k-nearest neighbor (KNN) strategy, i.e., $V_n^i$ is the KNN of $V_m^i$, if and only if $V_n^i$ is not further to $V_m^i$ than any other k images in the dataset. The minimization of the visual consistency term $\Sigma_{m,n=1}^{N^i} G_{mn}^i (y_m - y_n)^2$ may be taken as a graph based manifold regularization, which supports that visually similar images are assigned with similar rank predictions.

In at least one embodiment, the ranking module 214 determines the parameter $\gamma$ experimentally. It is understood in the context of this document that $\gamma$ may be fixed, and that balancing the textual and visual elements improves performance of the ranking model in equation (7).

Thus, equation (7) provides a ranking model that jointly incorporates an element based on textual features and an element based on visual features. In order to optimize equation (7), the ranking module 214 is configured to calculate the one or more model parameters w utilizing a large margin structured output learning framework. Given the labeled training set Q, the ranking module 214 is configured to learn the weight vector w so that the ranking model can more accurately predict the ranks of the images corresponding to the queries in training set Q, i.e., $$\min_w \frac{1}{2} \|w\|^2 \quad (9)$$
$$\text{s.t. } \forall q^i \in Q, \quad \forall y \neq y^i$$
$$F(w, x^i, v^i, y^i) - F(w, x^i, v^i, y) \geq 1$$

In order to accommodate the noises in the training data, slack variables are introduced to make the hard constraints soft, which provides:

$$\min_{w,\xi} \frac{1}{2} \|w\|^2 + C\Sigma \xi^i \quad (10)$$
$$\text{s.t. } \forall q^i \in Q, \quad \xi^i \geq 0, \quad \forall y \neq y^i$$
$$F(w, x^i, v^i, y^i) - F(w, x^i, v^i, y) \geq \Delta(y^i, y) - \xi^i,$$

where C>0 is a trade-off parameter that balances the model complexity $\|w\|^2$ and the upper bound of the prediction loss $\Sigma \xi^i$, and $\Delta(y^i, y)$ is the ranking loss function that measures the loss between the prediction y and the ground truth $y^i$, as previously mentioned. During the learning phase, if the prediction y is incorrect, i.e. $F(w, x^i, v^i, y^i) < F(w, x^i, v^i, y)$, then to satisfy the constraints, the corresponding slack variable $\xi^i$ is at least $\Delta(y^i, y)$.

Determining an optimal w using equation (6) is a nontrivial process because for each query, the number of constraints is exponential to the number of images returned to that query (i.e., very large). Accordingly, the ranking module 214 implements a cutting plane algorithm (Algorithm 1) that iteratively finds a small set of constraints and solves small-scale problems until the stop condition is satisfied.

---
Algorithm 1-The cutting plane algorithm
---

Input: Q, C, $\gamma$
    $W^i \leftarrow \emptyset$ for all $i = 1, \ldots, |Q|$
    repeat
        for $i = 1, \ldots, |Q|$ do
            $H(y; w) = \Delta(y^i, y) + F(w, x^i, v^i, y)$
            Compute $\hat{y} = \text{argmax}_{y \in \gamma} H(y; w)$
            Compute $\hat{\xi}^i = \max\{0, \max_{y \in W^i} H(y; w)\}$
            if $H(\hat{y}; w) > \hat{\xi}^i + \epsilon$ then
                $W^i \leftarrow W^i \cup \{\hat{y}\}$
                $w \leftarrow$ optimize Equation (10) over $W \cup_i W^i$
            end if
        end for
    until no $W^i$ has changed during iteration $W^i$

---

Algorithm 1 starts with an empty working constraint set $W^i$ and iteratively finds the most violated prediction $\hat{y}$ (MVP) for each query $q^i$ in the training query set Q. If a particular MVP violates a constraint by more than a predefined threshold $\epsilon$, the constraint will be added into the working constraint set $W^i$. The threshold $\epsilon$ is determined manually, and varies slightly for different datasets. Algorithm 1 uses the working constraint set $W^i$ to solve the optimization problem using the added constraints in $W^i$ for all queries $q^i$.

To implement algorithm 1, the ranking module 214 is configured to find the MVP for each query $q^i$, and calculate the optimized model weight vector w under the current working constraint set W as discussed herein.

Finding the Most Violated Prediction

The ranking module 214 is configured to find the MVP for each query $q^i$, i.e. $\hat{y}$ satisfying the following formula:

$$\text{argmax}_{y \in \mathcal{Y}} \Delta(y^i, y) - \gamma \Sigma_{m,n=1}^{N^i} G_{mn}^i (y_m - y_n)^2 + w^T \Psi(x^i, y). \quad (11)$$

The loss function is defined as the cosine similarity between the prediction y and the ground truth $y^i$, as follows:

$$\Delta(y^i, y) = 1 - \frac{(y^i)^T y}{\|y^i\| \|y\|}. \quad (12)$$

However, equation (11) is difficult to solve because the variables are discrete ranking values. Consequently, the ranking list is relaxed to be a real-value score list in order to solve equation (11). There will be a trivial solution when all the elements of y are equal to positive infinity. Thereafter, the score list is constrained to be normalized, i.e. $|y|=|y^i|=1$. By adding the constraint and substituting the loss function in equation (12) into equation (11), the following optimization problem is derived to find the most violated prediction:

$$\hat{y} = \text{argmax}_{y \in y} - (y^i)^T y - \gamma \sum_{m,n=1}^{N^i} G_{mn}^i (y_m - y_n)^2 + (z^i)^T y \quad (13)$$
$$= \text{argmax}_{y \in y} c^T y - \gamma \left( 2 \sum_{m=1}^{N^i} D_{mn}^i y_m^2 - 2 \sum_{m,n=1}^{N^i} G_{mn}^i y_m y_n \right)$$
$$= \text{argmin}_{y \in y} 2\gamma y^T L^i y - c^T y \text{ s.t. } \|y\| = 1$$

where $c = z^i - y^i$, and $L^i = D^i - G^i$ is the Laplacian matrix of the graph, which is symmetric positive semi-definite matrix, and $D^i = \text{diag}(d^i)$ denotes the degree matrix as $d^i = [d_1^i, \ldots, d_{N^i}^i]$ and $d_m^i = \Sigma_{n=1}^{N^i} G_{mn}^i$.

To solve the optimization problem (13), the Lagrange Multiplier $\lambda$ is introduced to eliminate the constraint, and because $\|y\|^2=\|y\|=1$, the problem can be transformed to:

$$\max_{\lambda \in \mathbb{R}} \min_{y,\varepsilon} \mathcal{Y} \, 2\gamma y^T(L^i+\lambda I)y - c^T y - \lambda \qquad (14)$$

where I is a $N^i \times N^i$ matrix.

In order to achieve a solution to problem (14), the case that the matrix $L^i+\lambda I$, which is positive semi-definite, is considered. Otherwise, the optimal value of the inner minimization problem will be negative infinite, which is undesirable to obtain a meaningful solution. Suppose the eigen decomposition of $L^i$ is:

$$L^i = U\Sigma U^T \qquad (15)$$

where $\Sigma$ is a diagonal matrix with $\text{diag}(\Sigma)=\{\lambda_1, \ldots, \lambda_{N^i}| \lambda_1 \geq \ldots \geq \lambda_{N^i}\}$ are the eigenvalues and U are the eigenvectors of $L^i$. Because $L^i$ is a graph Laplacian matrix, it has the smallest eigenvalue $\lambda_{N^i}=0$. Thus, to make sure $L^i+\lambda I=U(+\lambda I)U^T$ is positive semidefinite, the constraint $\lambda \geq 0$ is added.

When $\lambda>0$, $L^i+\lambda I$ is invertible, taking the derivatives of the objective function in (14) with respect to y, and setting it to zero, the solution of y becomes:

$$\hat{y} = \frac{1}{2}(L^i + \lambda I)^{-1}c \qquad (16)$$

Substituting equation (16) back into (14) provides:

$$\max_{\lambda \in \mathbb{R}+} -\frac{1}{4}c^T U(L^i + \lambda I)^{-1}c - \lambda \qquad (17)$$

By utilizing the eigen decomposition of $L^i$, (17) can be transformed to:

$$\max_{\lambda \in \mathbb{R}+} -\frac{1}{4}c^T U(\Sigma + \lambda I)^{-1}U^T c - \lambda \qquad (18)$$

Then the following problem is derived:

$$\min_{\lambda \in \mathbb{R}+} \sum_{j=1}^{N} \eta_j^2\left(\frac{1}{\lambda+\lambda_j}\right) + 4\lambda \qquad (19)$$

where $\eta = U^T c$. For abbreviation, $$g(\lambda) = \sum_{j=1}^{N} \eta_j^2\left(\frac{1}{\lambda+\lambda_j}\right) + 4\lambda.$$

There is no analytical solution for problem (19). However, with the second derivative:

$$\frac{\partial^2 g(\lambda)}{\partial \lambda^2} = 2\sum_{j=1}^{N^i} \eta_j^2(\lambda+\lambda_j)^{-3} \geq 0, \qquad (20)$$

$g(\lambda)$ is convex with respect to $\lambda$ for $\lambda>0$. In other words, the local minimum and global minimum of problem (19) are the same for the given interval $\lambda \in (0,+\infty)$. Thus, a binary search technique can find the optimal $\lambda$. The algorithm utilized to find the optimal $\lambda$ is provided in algorithm 2. Specifically, a recursive search for optimal $\lambda$ is performed by bounding a feasible region, until the bounding of the current feasible region is not more than $\epsilon$. The initial search upper bound is $$\hat{\Theta}_h = \frac{g(1)}{4}.$$

---

Algorithm 2
Algorithm 2 Finding the most violated prediction

---

Input: $G^i$, w, $x^i$, $y^i$, $\hat{\Theta}_h = \frac{g(1)}{4}$, $\varepsilon > 0$ Compute $L^i$, $\eta$, and $\Sigma$ according to (13) (15) and (19)
$\lambda \leftarrow \text{BinarySearch}(\eta, \Sigma, 0, \Theta_l, \Theta_h)$ $\hat{y} = \frac{1}{2}(L^i + \lambda I)^{-1}c$ Method $\lambda \leftarrow \text{BinarySearch}(\eta, \Sigma, \Theta_l, \Theta_h)$
  $\lambda \leftarrow (\Theta_l + \Theta_h)/2$
  if $|\Theta_h - \Theta_l| < \epsilon$ then
    Return $\lambda$
  end if
  $\tau \leftarrow (\Theta_h - \Theta_l)/6$
  $\delta_h \leftarrow g(\lambda + \tau)$
  $\delta_l \leftarrow g(\lambda - \tau)$
  if $\delta_h < \delta_l$ then
    Return BinarySearch$(\eta, \Sigma, \lambda - \tau, \Theta_h)$
  else
    Return BinarySearch$(\eta, \Sigma, \Theta_l, \lambda + \tau)$
  end if
end Method

---

Learning the Model Weight Vector

After determining the MVPs, and adding the violated constraints to the working constraint set $W^i$, the optimization of equation (10) in algorithm 1 can be solved, as follows:

$$\min_{w,\xi} \frac{1}{2}\|w\|^2 + C\Sigma \xi^i \qquad (21)$$

s.t. $\forall q^i \in Q, \; \forall \hat{y}_j^i \in W^i, \; \xi^i \geq 0, \; w^T u_j^i \geq b_j^i - \xi^i,$ where $\hat{y}_j^i \in W^i$, $u_j^i = \Psi(x^i, y^i) - \Psi(x^i, \hat{y})$, $b_j^i = \Delta(y^i, \hat{y}_j^i) + \gamma \Sigma_{m,n=1}^{N^i} G_{mn}^i ((y_m^i - y_n^i)^2 - (\hat{y}_{jm}^i - \hat{y}_{jn}^i)^2)$, $U=\{u_j^i | q^i \in Q, \hat{y}_j^i \in W^i\}$, and the kernel matrix K is defined as $K_{ij}=<u_i,u_j>$ for $\forall u_i, \forall u_j \in U$. By introducing the Lagrange multiplier $\alpha_j^i$ for each constraint, the following dual problem is obtained:

$$\max_{\alpha} b^T \alpha - \frac{1}{2}\alpha^T K \alpha \qquad (22)$$

so that $\alpha \geq 0$ and $\sum_{j=1}^{|w^i|} \alpha_j^i \leq C$, for $\forall q^i \in Q$ This may be a quadratic programming problem, which may be solved by using efficient algorithms such as Interior Point method. Based on the derivation, the optimized solution of w in (10) is:

$$\tilde{w} = \Sigma_{i=1}^{|Q|} \Sigma_{j=1}^{|w^i|} \alpha_j^i z_j^i \qquad (23)$$

As discussed herein, given a new query $q^t$, corresponding images with textual features and visual features $\{x^t, v^t\}$ can be predictably ranked based on the learned model parameter $\tilde{w}$, by substituting $\tilde{w}$ for w in equation (7).

Illustrative Processes

Example operations are described herein with reference to FIG. 4 and FIG. 5. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 depicts an example learning process 400 implemented by the ranking module 214 to optimize the ranking model in the training stage. Particularly, the process depicted in FIG. 4 utilizes the training data 104 to determine one or more model parameters w. To this end, the ranking module 214 uses the iterative process previously discussed in algorithm 1 to optimize w in order to improve the ranking model.

At 402, the ranking module 214 receives or has access to training data 104. The training data 104 includes a set of training queries and corresponding images, as well as the labeling assigned by the human oracles as discussed in relation to FIG. 1.

At 404, the ranking module 214 finds the most violated prediction (MVP) for the next query $q^i$ as previously discussed. The next query $q^i$ may be the first query in the set of training queries, or may be the next query $q^i$ following the previous query processed.

At 406, the ranking module 214 determines whether each query $q^i$ in the set of training queries has been processed. In other words, the ranking module 214 checks to see whether a MVP has already been found for each training query $q^i$ in the set of training queries.

In an event the ranking module determines that all queries $q^i$ have not been processed (i.e. "No" at 406), the ranking module 214 determines if the current MVP for query $q^i$ is greater than a pre-defined threshold ∈ at 408. If the MVP is not greater than the pre-defined threshold ∈ (i.e. "No" at 408), then the process moves to the next query $q^i$ in the training query set Q (i.e. returns to 404) to find the MVP for the next query $q^i$, and the process is repeated. If the MVP is greater than the pre-defined threshold E (i.e. "Yes" at 408), then the ranking module 214 adds the constraint to the working constraint set $W^i$ at 410.

At 412, the ranking module 214 utilizes the working constraint set $W^i$ to optimize w, as previously discussed. To this end, the ranking module 214 may calculate w using quadratic programming methods and update w accordingly.

At 414, the ranking module 214 associates the updated optimal w with the ranking model, which is defined in equation (7). The process is then repeated for each query $q^i$ in the training query set Q (i.e. returns to 404), until the iteration is completed. An iteration comprises processing each query in training query set Q (e.g. the for construct in algorithm 1).

At 406, if the ranking module 214 determines that each query $q^i$ in the set of training queries has been processed (i.e. "Yes" at 406), then the ranking module 214 determines whether the working constraint set $W^i$ has changed from one iteration to the next at 416 (i.e. this check is performed at the end of an iteration). If the working constraint set $W^i$ has changed (i.e. "Yes" at 416), the ranking module 214 starts again with the first query $q^i$ in the set of training queries at 418, and performs another iteration (i.e. returns to 404). If the working constraint set $W^i$ has not changed (i.e. "No" at 416), the ranking module 214 has learned the optimal w for the ranking model (e.g. $\hat{w}$ from equation 23) at 420.

FIG. 5 illustrates an example online process 500 that can be implemented by the search module 212 to search and retrieve images for a submitted query. The example online process 500 further illustrates ranking the images based on the ranking model optimized by the learning method illustrated in FIG. 4.

At block 502, the search module 212 receives a submitted query. In one embodiment, the query can be input and submitted via one of client computing devices 206(1) . . . (N).

At block 504, the search module 212 searches and retrieves candidate images that are relevant to the submitted query. The search module 212 retrieves the images from image database 216 and/or online image resources 218(1) and 218(2).

At block 506, the ranking model optimized by the ranking module 214 may be utilized to predict a rank for the retrieved images in accordance with their relevance to the submitted query. In at least one embodiment, the ranking model outputs (e.g. provides, calculates) a relevance score for each image retrieved.

At block 508, the ranked images are arranged into a structured list and the results are provided. In one embodiment, the structured list is based on the relevance scores output by the ranking model. In at least one embodiment, the structured list may be sent over networks 204 to be displayed to a user who submitted the query on one of client computing devices 206 (1) . . . (N) in a user-friendly manner.

Conclusion

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A computer-implemented method comprising:
    accessing training data including:
        at least one query;
        a set of images associated with the at least one query; and
        for an individual image of the set of images, one or more user-assigned labels indicating a degree of relevance of the individual image to the at least one query, the degree of relevance selected from a plurality of degrees of relevance;
    ranking the set of images associated with the at least one query based at least in part on the respective one or more user-assigned labels thereby providing a first relevance ranking of the set of images;
    extracting visual features from the set of images;
    extracting textual features associated with the set of images;
    ranking the set of images using a ranking model that jointly uses the visual features and the textual features thereby providing a second relevance ranking of the set of images;
    comparing the first relevance ranking of the set of images to the second relevance ranking of the set of images; and
    updating the ranking model based in part on ranking differences produced by the comparing.

2. The computer-implemented method of claim 1, wherein the ranking model includes a parameter utilized to balance relevance of the textual features against relevance of the visual features.

3. The computer-implemented method of claim 1, wherein the ranking model employs a sparse graph utilizing a k-nearest neighbor strategy to determine a similarity between a pair of images based at least in part on the visual features.

4. The computer-implemented method of claim 1, wherein updating the ranking model comprises utilizing a cutting plane algorithm that determines a constraint set.

5. The computer-implemented method of claim 4, wherein the constraint set is determined a least in part by finding a most violated prediction for the at least one query.

6. One or more device memories storing computer-executable instructions that, when executed via a processor, perform the method of claim 1.

7. A computer-implemented method comprising:
ranking a set of images associated with at least one training query based at least in part on user-assigned labels indicating a degree of relevance of an individual image to the at least one training query, the ranking providing a first relevance ranking of the set of images;
ranking, based at least in part on visual features and textual features associated with the set of images, the set of images using a ranking model thereby providing a second relevance ranking of the set of images;
comparing the first relevance ranking of the set of images to the second relevance ranking of the set of images;
updating the ranking model based in part on ranking differences produced by the comparing;
receiving an image search query;
retrieving a plurality of candidate images relevant to the image search query; and
ranking, based at least in cart on the ranking model, at least a portion of the plurality of candidate images.

8. The computer-implemented method of claim 7, wherein the ranking model employs a sparse graph utilizing a k-nearest neighbor strategy to determine a similarity between a pair of candidate images based on visual features extracted from the pair of candidate images.

9. The computer-implemented method of claim 7, wherein:
the ranking model is generated utilizing a cutting plane algorithm that determines a constraint set; and
the constraint set is determined by finding a most violated prediction for the at least one training query.

10. One or more device memories storing computer-executable instructions that, when executed via a processor, perform the method of claim 7.

11. The computer-implemented method of claim 7, further comprising:
extracting visual features from the at least the portion of the plurality of candidate images; and
determining textual features associated with the at least the portion of the plurality of candidate images, wherein the ranking model jointly incorporates a use of the textual features and a use of the visual features to rank the at least the portion of the plurality of candidate images, wherein the ranking model comprises a parameter utilized to balance relevance of the textual features against relevance of the visual features.

12. A computing device comprising:
at least one processor;
a memory coupled to the processor storing computer-executable instructions that, when executed by the at least one processor, configure the computing device to:
rank a set of images associated with at least one training query based at least in part on user-assigned labels indicating a degree of relevance of an individual image to the at least one training query, the ranking providing a first relevance ranking of the set of images;
rank, based at least in part on visual features and textual features associated with the set of images, the set of images using a ranking model thereby providing a second relevance ranking of the set of images;
compare the first relevance ranking of the set of images to the second relevance ranking of the set of images; and
update the ranking model based in part on ranking differences produced by the comparing.

13. The computing device of claim 12, wherein the ranking model optimizes one or more parameters by minimizing ranking loss based at least in part on the comparing, the one or more parameters being optimized based on a constraint set associated with a most violated prediction for the at least one training query.

14. The computing device of claim 12, wherein the ranking model employs a sparse graph utilizing a k-nearest neighbor strategy to determine a similarity between a pair of images based on the visual features.

15. The computing device of claim 12, wherein the ranking model comprises a parameter utilized to balance relevance of the textual features against relevance of the visual features.

* * * * *